(12) United States Patent
Twede et al.

(10) Patent No.: US 10,371,519 B1
(45) Date of Patent: Aug. 6, 2019

(54) POLARIZATION OPTICAL COMPASS

(71) Applicant: Lockheed Martin Corporation, Bethesda, MD (US)

(72) Inventors: David R. Twede, Orlando, FL (US); James N. O'Sullivan, Orlando, FL (US)

(73) Assignee: Lockheed Martin Corporation, Bethesda, MA (US)

( * ) Notice: Subject to any disclaimer, the term of this patent is extended or adjusted under 35 U.S.C. 154(b) by 30 days.

(21) Appl. No.: 15/606,761

(22) Filed: May 26, 2017

(51) Int. Cl.
*G01C 17/34* (2006.01)
*G01S 3/785* (2006.01)
*G02B 5/30* (2006.01)

(52) U.S. Cl.
CPC .............. *G01C 17/34* (2013.01); *G01S 3/785* (2013.01); *G02B 5/3025* (2013.01)

(58) Field of Classification Search
CPC ......... G01S 3/7867; G01S 3/789; G01S 19/10
See application file for complete search history.

(56) References Cited

PUBLICATIONS

Jinkui Chu et al, Design of a Novel Polarization Sensor for Navigation, Aug. 2007,2007 International Conference on Mechatronics and Automation, (Year: 2007).*
Cronin, Thomas W. et al., "Celestial polarization patterns during twilight," Applied Optics, vol. 45, Issue 22, Aug. 1, 2006, OSA The Optical Society, pp. 5582-5589.
Hecht, Eugene, "Chapter 8: Polarization," Optics (book), Second Edition, 1990, Addison-Wesley, pp. 270-326.
McMaster, William H., "Matrix Representation of Polarization," Reviews of Modem Physics, vol. 33, Issue 1, Jan. 1961, American Physical Society, pp. 8-28.
McMaster, William H., "Polarization and the Stokes Parameters," American Journal of Physics, vol. 22, Issue 5, Sep. 1954, AIP Publishing LLC., pp. 351-362.
Miyazaki, Daisuke et al., "Estimating Sunlight Polarization Using a Fish-eye Lens," IPSJ Transactions on Computer Vision and Applications, Technical Note, vol. 1, 2009, Information Processing Society of Japan, pp. 164-176.
Smith, Glenn S., "The polarization of skylight: An example from nature," American Journal of Physics, vol. 75, Issue 1, Jan. 2007, http://aapt.org/ajp, American Association of Physics Teachers, pp. 25-35.
Wang, Yujie et al., "Design of a Device for Sky Light Polarization Measurements," Sensors, vol. 14, Aug. 14, 2014, Issue 8, www.mdpi.com/journal/sensors, pp. 14916-14931.

* cited by examiner

*Primary Examiner* — Luke D Ratcliffe
(74) *Attorney, Agent, or Firm* — Withrow & Terranova, PLLC (57) ABSTRACT

An optical assembly that includes at least one polarizing filter assembly and at least one sensor. The polarizing filter assembly is configured to receive electromagnetic radiation (EMR) emitted by a sun and transmit at least three different portions of EMR towards the at least one sensor, each portion filtered based on a different polarization orientation. A processor device is configured to receive sensor data generated by the at least one sensor in response to receipt of the at least three different portions of EMR, and determine an elevation angle of the sun with respect to a horizon from a geographic location of the optical assembly.

22 Claims, 7 Drawing Sheets

POLARIZATION OPTICAL COMPASS

TECHNICAL FIELD

The embodiments relate to a polarization optical compass.

BACKGROUND

Navigation is often conducted via the global positioning system (GPS). However, at times, and at certain locations, GPS may not be available. In some situations, signals from GPS may even be intentionally blocked to inhibit the use of GPS for navigation purposes.

Optical compasses that do not rely on GPS exist, but are expensive. An optical compass that does not rely on GPS and that is relatively inexpensive would be beneficial for those places and/or times that GPS navigation is not available.

SUMMARY

The embodiments relate to a polarization optical compass that utilizes polarization characteristics of electromagnetic radiation emitted by the sun to determine an elevation of the sun, and an azimuth/bearing to the sun.

In one embodiment an optical assembly is provided. The optical assembly includes at least one polarizing filter assembly and at least one sensor comprising a grid of a plurality of detector elements. The optical assembly also includes a processor device coupled to the at least one sensor. The at least one polarizing filter assembly is configured to receive electromagnetic radiation (EMR) emitted by a sun and transmit, by the at least one polarizing filter assembly, at least three different portions of EMR towards the at least one sensor, each portion filtered based on a different polarization orientation. The processor device is configured to receive sensor data generated by the at least one sensor in response to receipt of the at least three different portions of EMR, and based on the sensor data, determine an elevation angle of the sun with respect to a horizon from a geographic location of the optical assembly.

In another embodiment a method is provided. The method includes receiving, by at least one polarizing filter assembly, electromagnetic radiation (EMR) emitted by a sun. The method further includes passing, by the at least one polarizing filter assembly, at least three different portions of EMR towards at least one sensor, each portion filtered based on a different polarization orientation, the at least one sensor comprising a grid of a plurality of detector elements. The method further includes generating, by the at least one sensor, sensor data in response to the receipt of the at least three different portions of EMR. The method further includes, based on the sensor data, determining an elevation angle of the sun with respect to a horizon from a geographic location.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first polarizing filter" and "second polarizing filter," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified.

Figure 1:
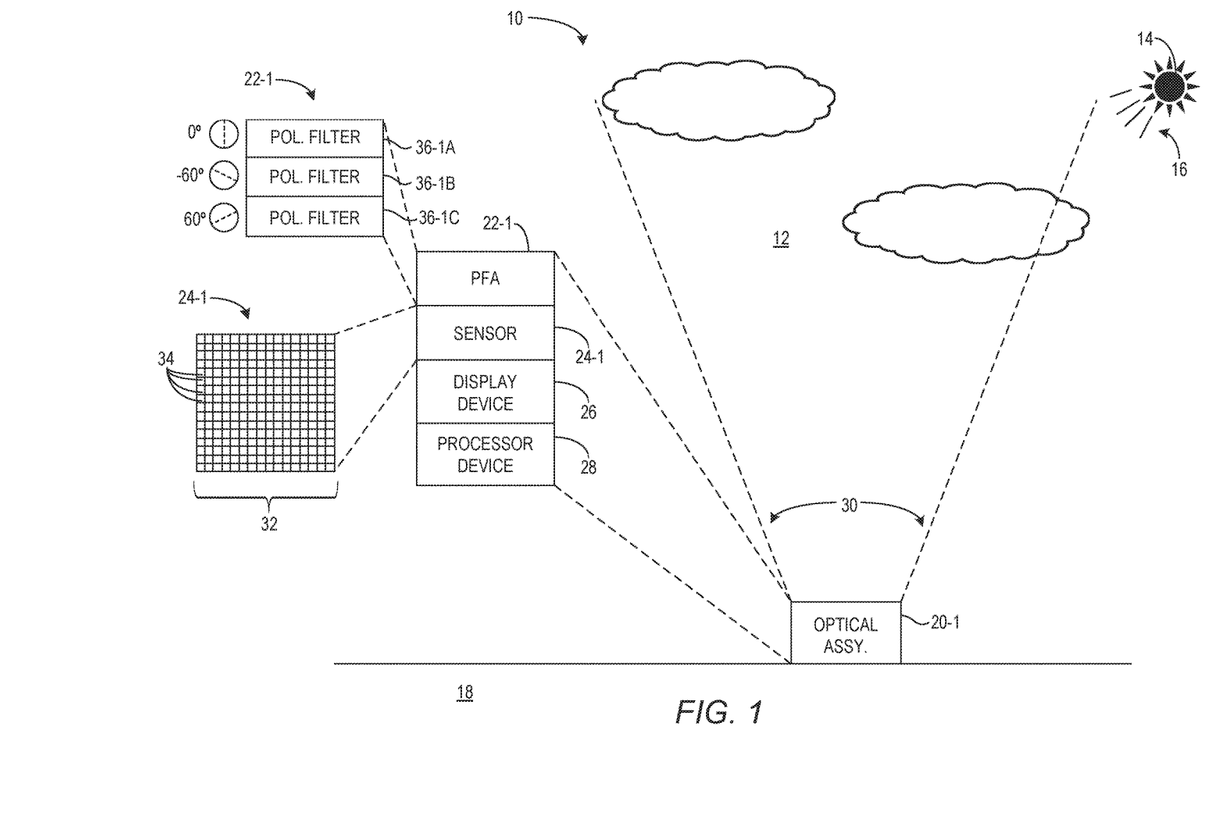
FIG. 1 is a block diagram of an environment in which embodiments can be practiced.

The embodiments relate to a polarization optical compass that utilizes polarization characteristics of electromagnetic radiation (EMR) emitted by the sun to determine an elevation of the sun, and an azimuth/bearing to the sun. FIG. 1 is a block diagram of an environment 10 in which embodiments can be practiced. The environment 10 includes an atmosphere 12 and a sun 14. The sun 14 emits EMR 16 toward an earth 18. As the EMR 16 contacts the atmosphere 12, the EMR 16 is polarized by molecules of the atmosphere 12. An optical assembly 20-1 includes a polarizing filter assembly 22-1, a sensor 24-1, optionally a display device 26, and a processor device 28. The processor device 28 is communicatively coupled to the sensor 24-1 and the display device 26. The optical assembly 20-1 has a field of view (FOV) 30. The polarizing filter assembly 22-1 receives the EMR 16 emitted by the sun 14 within the FOV 30, and passes at least three different portions of the EMR 16 to the sensor 24-1, each portion of the EMR 16 filtered based on a different polarization orientation. For example, the polarization orientations may be linear polarization orientations, each of which is 60 degrees apart from one another. Each portion of the EMR 16 may also be in a different waveband, such as a first portion in a first visible waveband, such as a green waveband, a second portion in a second visible waveband, such as a blue waveband, and a third portion in a third visible waveband, such as a red waveband. Alternatively, one or more portions of the EMR 16 may be in the same waveband. The phrase "waveband" as used herein means a continuous range of wavelengths.

The sensor 24-1 is sensitive to the first, second, and third wavebands. In the case of the visible spectrum, the sensor 24-1 may be a complimentary metal-oxide semiconductor (CMOS) or a charge-coupled device (CCD) detector. In the case of the infrared spectrum, the sensor 24-1 may be a focal plane array. The sensor 24-1 is made up of a grid 32 of a plurality of detector elements 34. The grid 32 may be any desired resolution, such as 1024×1024, 512×512, or any other resolution. The sensor 24-1 is configured to generate sensor data based on the receipt of the portions of EMR 16 received by the sensor 24-1. The sensor data characterizes the EMR 16 received by each detector element 34 in the grid 32.

The processor device 28 receives the sensor data, and identifies a particular detector element 34 of the plurality of detector elements 34 based on the sensor data and a degree of polarization received by the particular detector element 34. Mechanisms for determining the degree of polarization received by a detector element 34, and the selection of the particular detector element 34 are discussed below. In one embodiment, the processor device 28 determines the particular set of detector elements 34 appropriate for determining the elevation angle of the sun. Based on the location and degree of polarization values of this particular set of detector elements 34 in the grid 32, the processor device 28 determines an elevation angle of the sun 14 with respect to a horizon from a geographical location. Mechanisms for determining the elevation angle of the sun 14 are discussed below.

In one embodiment, the processor device 28 also determines a polarization angle for each of the plurality of detector elements 34, and based at least in part on the polarization angle for each of the plurality of detector elements 34 and the determined elevation of the sun 14, determines an azimuth of the sun 14 with respect to a reference meridian. The processor device 28 may then determine the time of day, and access data that identifies where the sun is located based on the date and time of day, and determine north, south, east, and west. The processor device 28 may display such information on the display device 26. In other embodiments, the optical assembly 20-1 may be used in conjunction with a guidance control system of an object, such as a plane, drone, missile, ground vehicle, robot, or the like, and may interface with the guidance control system to control the movement of the object.

In this embodiment, the polarizing filter assembly 22-1 includes a first polarizing filter 36-1A, a second polarizing filter 36-1B, and a third polarizing filter 36-1C. The first polarizing filter 36-1A is configured to receive the EMR 16 emitted by the sun 14 and to transmit a first subset of EMR 16 that includes a first portion of EMR in a first waveband that has a first polarization orientation. For example, the first waveband may be wavelengths in the visible blue spectrum, such as wavelengths in a range between about 450 nanometers (nm) to about 495 nm (referred to herein as blue EMR for the sake of brevity). The first polarization orientation may be a linear polarization orientation, such as an orientation at zero degrees, for example. The first polarizing filter 36-1A blocks, or filters out, EMR in the first waveband having any other polarization orientation than the first polarization orientation. The phrase "transmit" as used herein in conjunction with a polarizing filter 36 refers to the emission by the polarizing filter 36 of EMR that has passed through the polarizing filter 36, and does not imply active electronics that actively transmit EMR.

The first subset of EMR 16 also includes EMR in a second waveband irrespective of polarization orientation, and EMR in a third waveband irrespective of polarization orientation. Merely as examples, the second waveband may be wavelengths in the visible red spectrum, such as wavelengths in a range between about 625 nm and 675 nm (referred to herein as red EMR for the sake of brevity), and the third waveband may be wavelengths in the visible green spectrum, such as wavelengths in a range between about 495 nm and 570 nm (referred to herein as green EMR for the sake of brevity).

The second polarizing filter 36-1B is downstream of the first polarizing filter 36-1A and is configured to receive the first subset of EMR 16 and to transmit a second subset of EMR 16 that includes a second portion of EMR in the second waveband (e.g., red EMR) that has a second polarization orientation. For example, the second polarization orientation may be a linear polarization orientation, such as an orientation at 60 degrees, for example. The second polarizing filter 36-1B blocks, or filters out, EMR in the second waveband having any other polarization orientation than the second polarization orientation. The second polarizing filter 36-1B also transmits the EMR in the third waveband (e.g., green EMR) irrespective of polarization orientation, and transmits the first portion of EMR (e.g., blue EMR) in the first waveband.

The third polarizing filter 36-1C is downstream of the second polarizing filter 36-1B and is configured to receive the second subset of EMR 16 and to transmit a third subset of EMR 16 that includes a third portion of EMR (e.g., green EMR) in the third waveband that has a third polarization orientation. For example, the third polarization orientation may be a linear polarization orientation, such as an orientation at 120 degrees, for example. The third polarizing filter 36-1C blocks, or filters out, EMR in the third waveband having any other polarization orientation than the third polarization orientation. The third polarizing filter 36-1C also transmits the second portion of EMR (e.g., red EMR) in the second waveband, and the first portion of EMR (e.g., blue EMR) in the first waveband.

The polarizing filters 36 discussed herein may be sourced from any of a number of optics manufacturers or distributors, such as Edmund Optics Inc. located at 101 East Gloucester Pike, Barrington, N.J. 08007-1380, Deposition Sciences, Inc. located at 3300 Coffey Lane, Santa Rosa Calif. 95403, or MOXTEK, Inc. located at 452 W 1260 N, Orem, Utah 84057.

The third subset of EMR 16 is then transmitted to the sensor 24-1. In some embodiments the third subset of EMR 16 may pass through one or more lens arrangements that, for example, focus the third subset of EMR 16 on an image plane at which the sensor 24-1 is located. The polarizing filter assembly 22-1 may be placed at any location along the optical path, including at a pupil plane or an image plane.

The sensor 24-1 comprises a plurality of detector elements sensitive to EMR in the first waveband, EMR in the second waveband, and EMR in the third waveband. The sensor 24-1 may comprise, for example, a CMOS or CCD sensor device. In other embodiments, such as embodiments that operate in the infrared wavebands, the sensor 24-1 may comprise a focal plane array (FPA), for example. The sensor 24-1 is also configured to distinguish the EMR in the first waveband from the EMR in the second and third wavebands. For example, the sensor 24-1 may include, or may be downstream of, a color filter array such as a Bayer filter mosaic, or other color separating mechanisms, such as spectral dispersive elements, notch filters, bandpass filters, and the like. The sensor 24-1 may have any desired resolution, such as a 1024×1024 grid of 1,048,576 detector elements. The sensor 24-1 generates sensor data that characterizes the EMR received by each detector element 34. The processor device 28 receives the sensor data, and, as discussed briefly above and in greater detail below, utilizes such sensor data to identify an elevation and azimuth, or bearing, to the sun.

Figure 2:
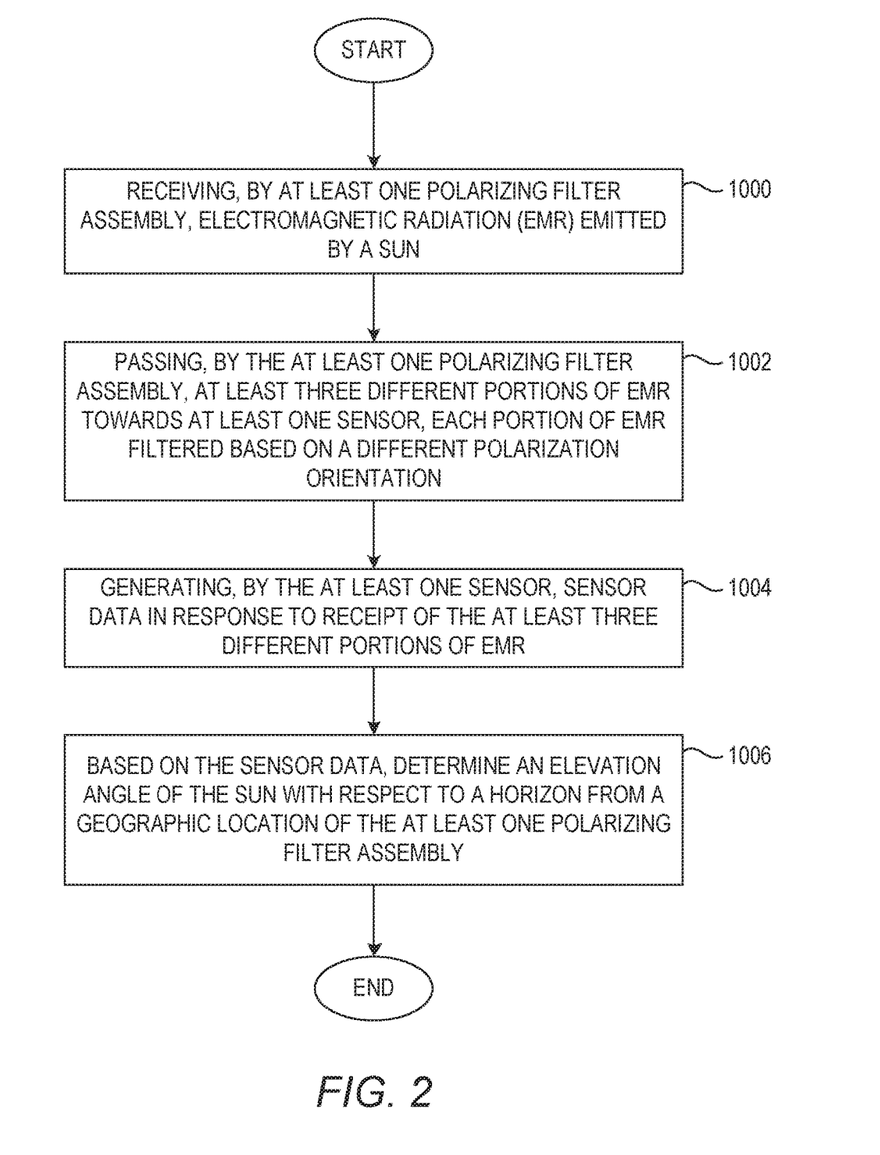
FIG. 2 is a flowchart of a method for determining an elevation angle of the sun according to one embodiment.

FIG. 2 is a flowchart of a method for determining an elevation angle of the sun according to one embodiment. FIG. 2 will be discussed in conjunction with FIG. 1. The optical assembly 20-1 includes at least one polarizing filter assembly 22-1 and at least one sensor 24-1. The at least one sensor 24-1 includes the grid 32 of the plurality of detector elements 34. The optical assembly 20-1 receives the EMR 16 emitted by the sun 14. The polarizing filter assembly 22-1 receives the EMR 16 emitted by the sun 14 (FIG. 2, block 1000). The polarizing filter assembly 22-1 passes at least three portions of the EMR 16 to the at least one sensor 24-1, each portion of the EMR 16 being filtered based on a different polarization orientation, and at least two portions of the at least three different portions of the EMR 16 comprising different wavebands of the EMR 16 (FIG. 2, block 1002). The sensor 24-1 includes the grid 32 of the plurality of detector elements 34. The sensor 24-1 generates sensor data in response to the receipt of the at least three portions of the EMR 16 (FIG. 2, block 1004). Based on the sensor data, the processor device 28 determines an elevation angle of the sun with respect to a horizon from a geographic location of the polarizing filter assembly 22-1 (FIG. 2, block 1006).

Figure 3:
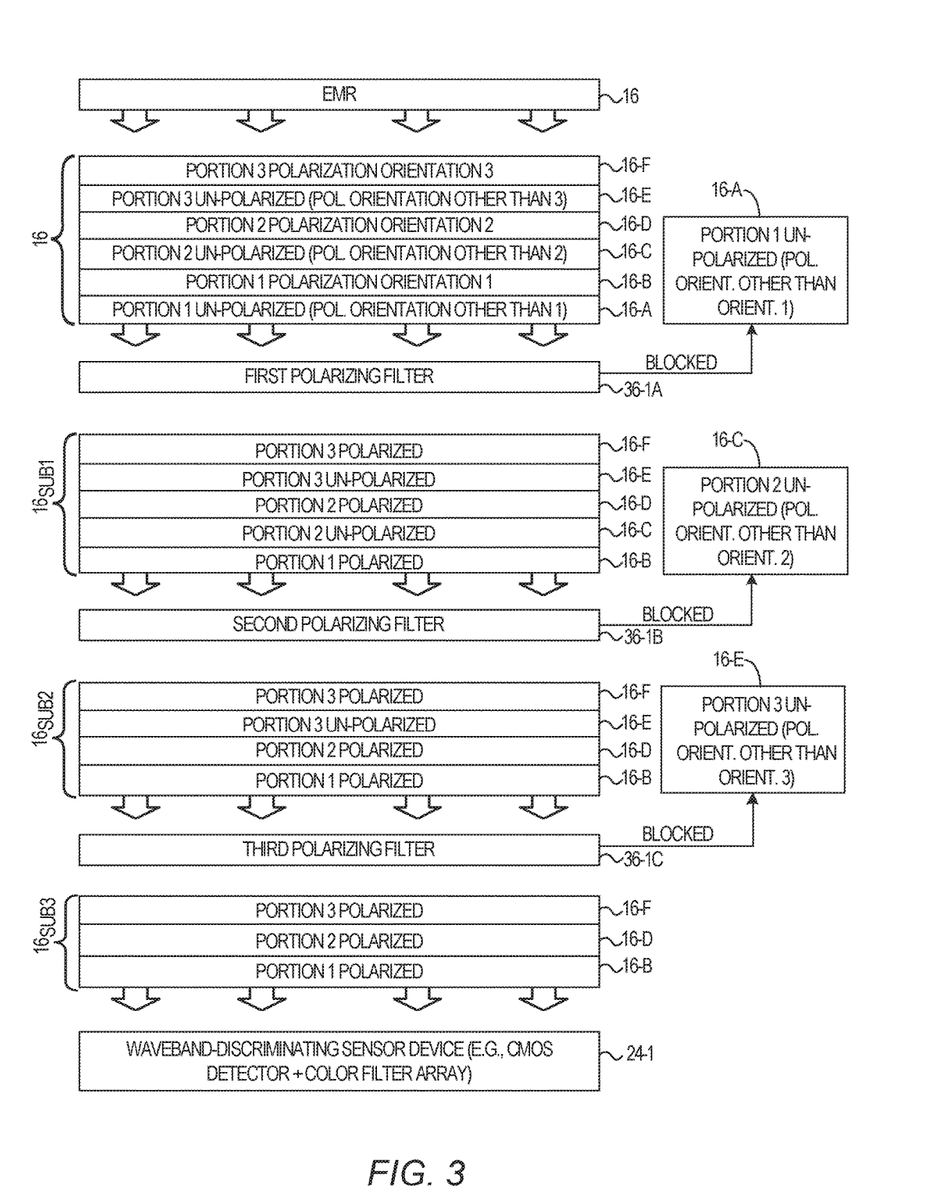
FIG. 3 is a block diagram illustrating filtering aspects of a polarizing filter assembly discussed with regard to FIGS. 1 and 2, according to one embodiment.

FIG. 3 is a block diagram illustrating filtering aspects of the polarizing filter assembly 22-1 discussed above with regard to FIGS. 1 and 2 according to one embodiment. In this example, the EMR 16 includes EMR portion 16-A comprising EMR in the first waveband (e.g., blue EMR) having any polarization orientation other than the first polarization orientation, EMR portion 16-B comprising EMR in the first waveband having the first polarization orientation, EMR portion 16-C comprising EMR in the second waveband (e.g., red EMR) having any polarization orientation other than the second polarization orientation, EMR portion 16-D comprising EMR in the second waveband having the second polarization orientation, EMR portion 16-E comprising EMR in the third waveband (e.g., green EMR) having any polarization orientation other than the third polarization orientation, and EMR portion 16-F comprising EMR in the third waveband having the third polarization orientation.

A first polarizing filter 36-1A transmits a first subset of EMR $16_{SUB1}$ downstream, and blocks the EMR portion 16-A comprising EMR in the first waveband having any polarization orientation other than the first polarization orientation. The first subset of EMR $16_{SUB1}$ thus comprises the EMR portion 16-B-the EMR portion 16-F. A second polarizing filter 36-1B transmits a second subset of EMR $16_{SUB2}$ downstream, and blocks the EMR portion 16-C. The second subset of EMR $16_{SUB2}$ thus comprises the EMR portion 16-B and the EMR portion 16-D-the EMR portion 16-F.

A third polarizing filter 36-1C transmits a third subset of EMR $16_{SUB3}$ downstream, and blocks the EMR portion 16-E. The third subset of EMR $16_{SUB3}$ thus comprises the EMR portion 16-B, the EMR portion 16-D, and the EMR portion 16-F. The sensor 24-1 receives the third subset of EMR $16_{SUB3}$, comprising the EMR portions 16-B, 16-D, and 16-F, and generates sensor data, as discussed above with regard to FIGS. 1 and 2.

Figure 4:
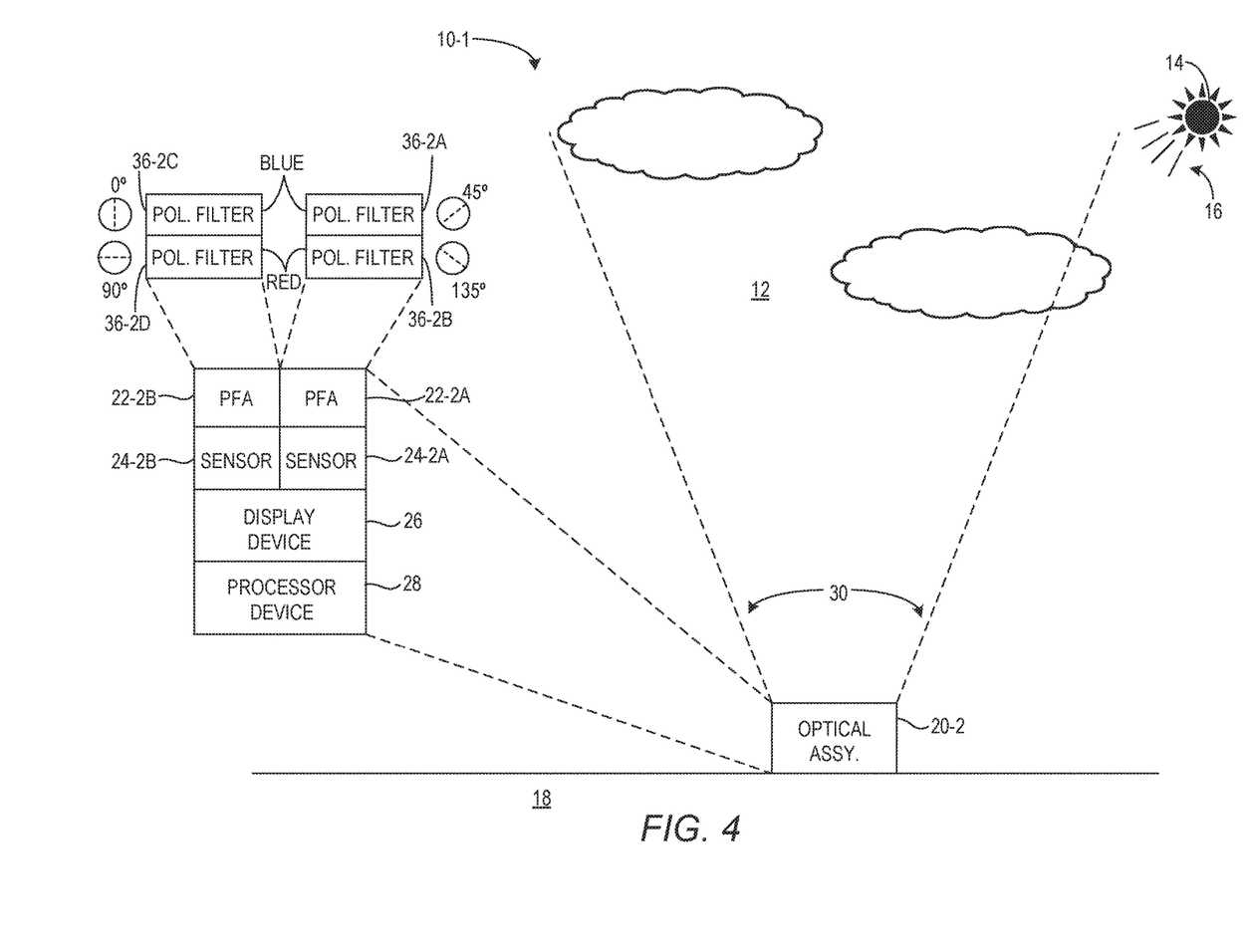
FIG. 4 is a block diagram of an environment in which additional embodiments can be practiced.

FIG. 4 is a block diagram of an environment 10-1 in which additional embodiments can be practiced. The environment 10-1 includes the atmosphere 12 and the sun 14. The sun 14 emits the EMR 16 toward the earth 18. As the EMR 16 contacts the atmosphere 12, the EMR 16 is polarized by molecules of the atmosphere 12. An optical assembly 20-2 includes two polarizing filter assemblies 22-2A, 22-2B, two sensors 24-2A, 24-2B, optionally the display device 26, and the processor device 28. The sensors 24-2A, 24-2B are similar to the sensor 24-1 discussed above with regard to FIG. 1, except as otherwise noted herein.

The processor device 28 is communicatively coupled to the sensors 24-2A, 24-2B and the display device 26. In other embodiments, the optical assembly 20-2 may include two processor devices 28, one for each sensor 24-2A, 24-2B. The optical assembly 20-2 has the field of view (FOV) 30. The polarizing filter assemblies 22-2A, 22-2B may be co-boresighted such that each has the same FOV 30. The polarizing filter assembly 22-2A includes a first polarizing filter 36-2A and a second polarizing filter 36-2B downstream of the first polarizing filter 36-2A. The first polarizing filter 36-2A receives the EMR 16 emitted by the sun 14 within the FOV 30, and transmits a first subset of EMR 16 that includes a first portion of EMR in a first waveband that has a first polarization orientation, and blocks EMR in the first waveband that has a polarization orientation other than the first polarization orientation. The first polarizing filter 36-2A also transmits EMR in a second waveband that is different from the first waveband, irrespective of polarization orientation. For example, the first waveband of EMR may be blue EMR, and the second waveband of EMR may be red EMR.

The second polarizing filter 36-2B receives the first subset of EMR 16 and transmits toward the sensor 24-2A a second subset of EMR 16 that includes a second portion of EMR in the second waveband that has a second polarization orientation and blocks EMR in the second waveband that has a polarization orientation other than the second polarization orientation. The second polarizing filter 36-2B also transmits toward the sensor 24-2A the first portion of EMR in the first waveband. In this embodiment, the first polarization orientation and the second polarization orientation may be 90 degrees from one another, such as at 45 degrees and at 135 degrees. The sensor 24-2A is configured to generate sensor data based on the receipt of the portions of EMR 16 received by the sensor 24-2A. The sensor data characterizes the portions of EMR 16 received by each detector element 34 in the grid 32.

The polarizing filter assembly 22-2B includes a third polarizing filter 36-2C and a fourth polarizing filter 36-2D downstream of the third polarizing filter 36-2C. The third polarizing filter 36-2C receives the EMR 16 emitted by the sun 14 within the FOV 30, and transmits a third subset of EMR 16 that includes a third portion of EMR in a third waveband that has a third polarization orientation, and blocks EMR in the third waveband that has a polarization orientation other than the third polarization orientation. The third polarizing filter 36-2C also transmits EMR in a fourth waveband that is different from the third waveband, irrespective of polarization orientation. For example, the third waveband of EMR may be blue EMR, and the fourth waveband of EMR may be red EMR.

The fourth polarizing filter 36-2D receives the third subset of EMR 16 and transmits toward the sensor 24-2B a fourth subset of EMR 16 that includes a fourth portion of EMR in the fourth waveband that has a fourth polarization orientation and blocks EMR in the fourth waveband that has a polarization orientation other than the fourth polarization orientation. The fourth polarizing filter 36-2D also transmits toward the sensor 24-2B the third portion of EMR in the third waveband. In this embodiment, the third polarization orientation and the fourth polarization orientation may be 90 degrees from one another, may be different from the first polarization orientation and the second polarization orientation, and may be polarization orientations at 0 degrees and at 90 degrees, for example. Note that the first and third wavebands may be the same or different wavebands, and the second and fourth wavebands may be the same or different wavebands.

The sensor 24-2B is configured to generate sensor data based on the receipt of the portions of EMR 16 received by the sensor 24-2B. The sensor data characterizes the EMR 16 received by each detector element 34 in the grid 32 of the sensor 24-2B.

The processor device 28 in this embodiment thus has information from two different wavebands, blue EMR and red EMR, and four different polarization orientations. The use of four different polarization orientations and two different wavebands may provide more accuracy than the third optical assembly 20-1 discussed above in FIGS. 1-3. Mechanisms for using such information to determine a bearing to the sun 14 are discussed below.

Figure 5:
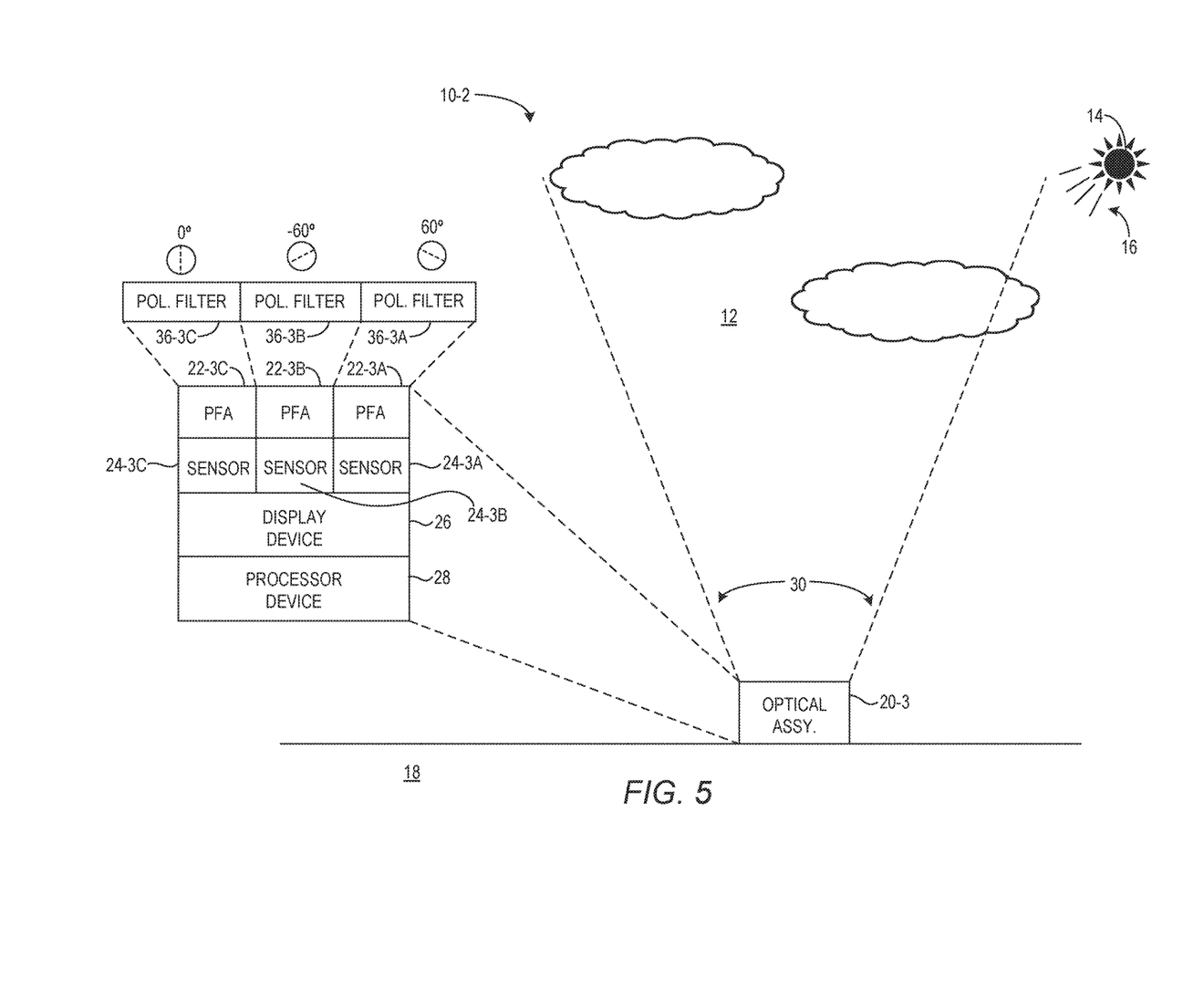
FIG. 5 is a block diagram of an environment in which additional embodiments can be practiced.

FIG. 5 is a block diagram of an environment 10-2 in which additional embodiments can be practiced. The environment 10-2 includes the atmosphere 12 and the sun 14. The sun 14 emits the EMR 16 toward the earth 18. As the EMR 16 contacts the atmosphere 12, the EMR 16 is polarized by molecules of the atmosphere 12. An optical assembly 20-3 includes three polarizing filter assemblies 22-3A-22-3C, three sensors 24-3A-24-3C, optionally the display device 26, and the processor device 28. The sensors 24-3A-24-3C are similar to the sensor 24-1 discussed above with regard to FIG. 1, except as otherwise noted herein.

The processor device 28 is communicatively coupled to the sensors 24-3A-24-3C and the display device 26. In other embodiments, the optical assembly 20-3 may include three processor devices 28, one for each sensor 24-3A, 24-3B, and 24-3C. The optical assembly 20-3 has a field of view (FOV) 30. The polarizing filter assemblies 22-3A-22-3C may be co-boresighted such that each has the same FOV 30. The polarizing filter assembly 22-3A includes a polarizing filter 36-3A that receives the EMR 16 emitted by the sun 14 within the FOV 30, and transmits a first subset of EMR 16 toward the sensor 24-3A that includes a first portion of EMR in a first waveband that has a first polarization orientation, and blocks EMR in the first waveband that has a polarization orientation other than the first polarization orientation. For example, the first waveband of EMR may be blue EMR. The first polarizing filter 36-3A may also transmit EMR outside of the first waveband irrespective of polarization orientation, or may block EMR outside of the first waveband. The sensor 24-3A is configured to generate sensor data based on the receipt of the portions of EMR 16 received by the sensor 24-3A. The sensor data characterizes the portions of EMR 16 received by each detector element 34 in the grid 32 of the sensor 24-3A.

The polarizing filter assembly 22-3B includes a polarizing filter 36-3B that receives the EMR 16 emitted by the sun 14 within the FOV 30, and transmits toward the sensor 24-3B a second subset of EMR 16 that includes a second portion of EMR in a second waveband that has a second polarization orientation, and blocks EMR in the second waveband that has a polarization orientation other than the second polarization orientation. For example, the second waveband of EMR may be red EMR. The second polarizing filter 36-3B may also transmit EMR outside of the second waveband irrespective of polarization orientation, or may block EMR outside of the second waveband. The sensor 24-3B is configured to generate sensor data based on the receipt of the portions of EMR 16 received by the sensor 24-3B. The sensor data characterizes the portions of EMR 16 received by each detector element 34 in the grid 32 of the sensor 24-3B.

The polarizing filter assembly 22-3C also includes a polarizing filter 36-3C that receives the EMR 16 emitted by the sun 14 within the FOV 30, and transmits toward the sensor 24-3C a third subset of EMR 16 that includes a third portion of EMR in a third waveband that has a third polarization orientation, and blocks EMR in the third waveband that has a polarization orientation other than the third polarization orientation. For example, the third waveband of EMR may be green EMR. The third polarizing filter 36-3C may also transmit EMR outside of the third waveband irrespective of polarization orientation, or may block EMR outside of the third waveband. The first polarization orientation, the second polarization orientation, and the third polarization orientation may be linear polarization orientations that are 60 degrees from one another, such as at zero degrees, sixty degrees, and 120 degrees. The sensor 24-3C is configured to generate sensor data based on the receipt of the portions of EMR 16 received by the sensor 24-3C. The sensor data characterizes the EMR 16 received by each detector element 34 in the grid 32 of the sensor 24-3C.

The processor device 28 in this embodiment thus has information from three different wavebands, blue EMR, red EMR, and green EMR, and three different polarization orientations. Mechanisms for using such information to determine a bearing to the sun 14 are discussed below.

Figure 6:
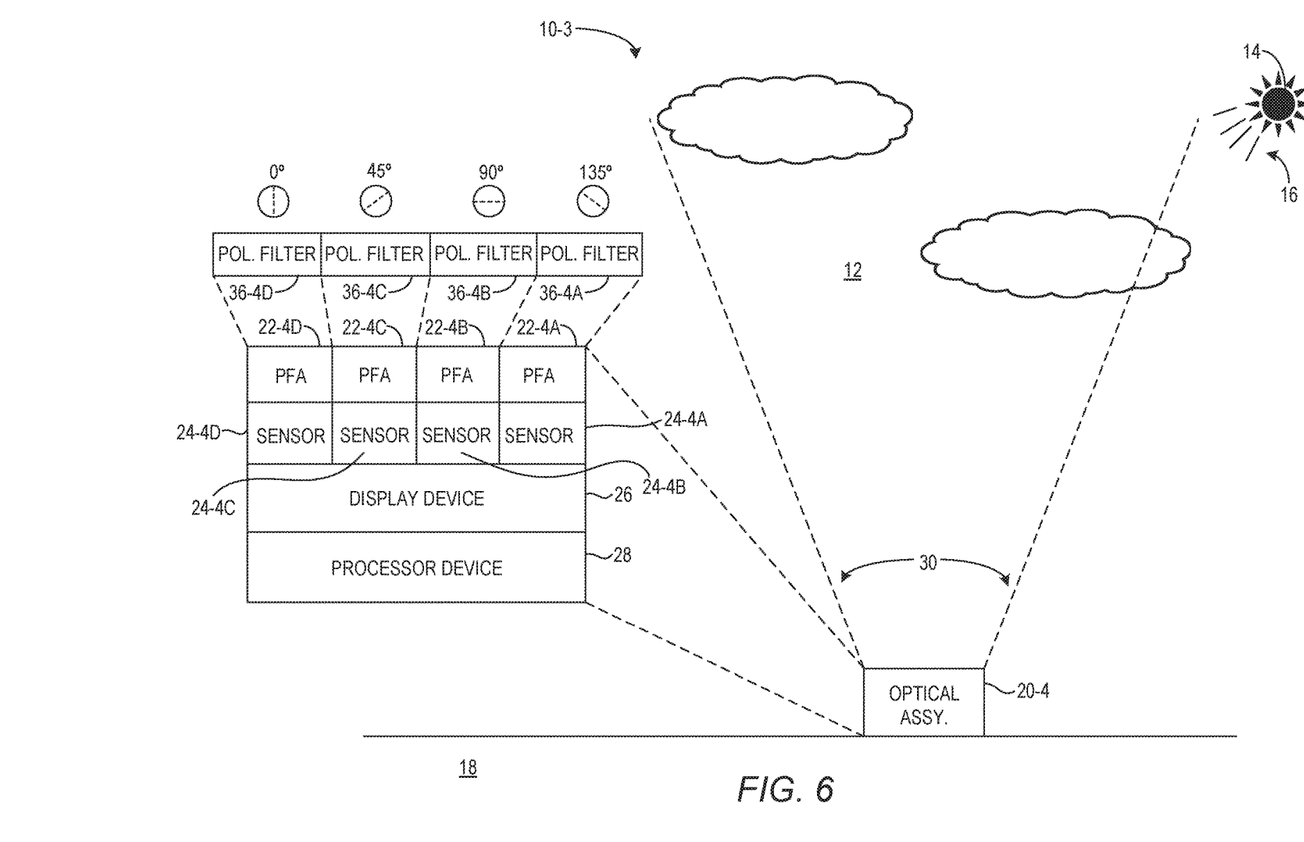
FIG. 6 is a block diagram of an environment in which additional embodiments can be practiced.

FIG. 6 is a block diagram of an environment 10-3 in which additional embodiments can be practiced. The environment 10-3 includes the atmosphere 12 and the sun 14. The sun 14 emits the EMR 16 toward the earth 18. As the EMR 16 contacts the atmosphere 12, the EMR 16 is polarized by molecules of the atmosphere 12. An optical assembly 20-4 includes four polarizing filter assemblies 22-4A-22-4D, four sensors 24-4A-24-4D, optionally the display device 26, and the processor device 28. The sensors 24-4A-24-4D are similar to the sensor 24-1 discussed above with regard to FIG. 1, except the four sensors 24-4A-24-4D are monochrome sensors that do not have a color filter array or other upstream optical element that distinguishes colors.

The processor device 28 is communicatively coupled to the sensors 24-4A-24-4D and the display device 26. In other embodiments, the optical assembly 20-4 may include four processor devices 28, one for each sensor 24-4A, 24-4B, 24-4C, and 24-4D. The optical assembly 20-4 has a field of view (FOV) 30. The polarizing filter assemblies 22-4A-22-4D may be co-boresighted such that each has the same FOV 30. The polarizing filter assembly 22-4A includes a first polarizing filter 36-4A that receives the EMR 16 emitted by the sun 14 within the FOV 30, and transmits a first subset of EMR 16 toward the sensor 24-4A that includes a first portion of EMR in a first waveband that has a first polarization orientation, and blocks EMR in the first waveband that has a polarization orientation other than the first polarization orientation. For example, the first waveband of EMR may be blue EMR. The first polarizing filter 36-4A may also transmit EMR outside of the first waveband irrespective of polarization orientation, or may block EMR outside of the first waveband. The sensor 24-4A is configured to generate sensor data based on the receipt of the portions of EMR 16 received by the sensor 24-4A. The sensor data characterizes the EMR 16 received by each detector element 34 in the grid 32 of the sensor 24-4A.

The polarizing filter assembly 22-4B includes a polarizing filter 36-4B that receives the EMR 16 emitted by the sun 14 within the FOV 30, and transmits toward the sensor 24-4B a second subset of EMR 16 that includes a second portion of EMR in a second waveband that has a second polarization orientation, and blocks EMR in the second waveband that has a polarization orientation other than the second polarization orientation. For example, the second waveband of EMR may be red EMR. The second polarizing filter 36-4B may also transmit EMR outside of the second waveband irrespective of polarization orientation, or may block EMR outside of the second waveband. The sensor 24-4B is configured to generate sensor data based on the receipt of the portions of EMR 16 received by the sensor 24-4B. The sensor data characterizes the portions of EMR 16 received by each detector element 34 in the grid 32 of the sensor 24-4B.

The polarizing filter assembly 22-4C includes a polarizing filter 36-4C that receives the EMR 16 emitted by the sun 14 within the FOV 30, and transmits toward the sensor 24-4C a third subset of EMR 16 that includes a third portion of EMR in a third waveband that has a third polarization orientation, and blocks EMR in the third waveband that has a polarization orientation other than the third polarization orientation. For example, the third waveband of EMR may be blue EMR, the same as the first waveband of EMR. The third polarizing filter 36-4C may also transmit EMR outside of the third waveband irrespective of polarization orientation, or may block EMR outside of the third waveband.

The polarizing filter assembly 22-4D includes a polarizing filter 36-4D that receives the EMR 16 emitted by the sun 14 within the FOV 30, and transmits toward the sensor 24-4D a third subset of EMR 16 that includes a fourth portion of EMR in a fourth waveband that has a fourth polarization orientation, and blocks EMR in the fourth waveband that has a polarization orientation other than the fourth polarization orientation. For example, the fourth waveband of EMR may be red EMR, the same as the second waveband of EMR. The fourth polarizing filter 36-4D may also transmit EMR outside of the fourth waveband irrespective of polarization orientation, or may block EMR outside of the fourth waveband.

The first polarization orientation, the second polarization orientation, the third polarization orientation, and the fourth polarization orientations may be linear polarization orientations with a 45 degree separation, such as 0 degrees, 45 degrees, 90 degrees, and 135 degrees.

The processor device 28 in this embodiment thus has information from four different polarization orientations. Mechanisms for using such information to determine a bearing to the sun 14 are discussed below.

Mechanisms for Determining Elevation and Azimuth/Bearing to the Sun

The mechanisms herein calculate various metrics, including a degree of polarization (DOP) and a polarization angle, to determine elevation and/or azimuth/bearing to the sun. Mechanisms for determining these metrics will now be discussed. The optical assembly 20-2 illustrated in FIG. 4 will be used as an example, but the principles discussed herein apply to each of the various embodiments. Referring again to FIG. 4, as the EMR 16 enters the atmosphere 12 it is initially unpolarized. As the EMR 16 interacts with the air molecules in the atmosphere 12, some of the EMR 16 becomes linearly polarized. When an image is taken by the optical assembly 20-2 from a particular location, a plane containing the location of the optical assembly 20-2, the point in the sky and the sun 14 may be visualized. For each detector element 34 in the grid 32 (FIG. 1) of the sensors 24-2A, 24-2B, the percentage of linearly polarized EMR 16 received by that detector element 34 when compared to the total amount of EMR 16 is called the degree of polarization (DOP) for that detector element 34.

The computation of the DOP and the polarization angle uses the Stokes parameters. The Stokes parameters describe the polarization content of light, such as the EMR 16. There are four Stokes parameters, referred to as S0, S1, S2, and S3. These parameters may be obtained by making measurements using polarizing filters that pass light having different polarization characteristics, such as horizontal, vertical, or circular. The four Stokes parameters may then be computed based on these measurements. Sky light can be decomposed into only linear Stokes parameters to calculate the sun elevation and bearing values. Circular polarization can be used as well in the same calculation, but is unneeded if S0, S1, and S2 are computed.

In this embodiment, four polarization orientation angles are utilized, 0 degrees, 45 degrees, 90 degrees, and 135 degrees. In particular, the polarizing filter assembly 22-2B has polarizing filter 36-2C that transmits blue EMR 16 having a linear polarization orientation along 0 degrees, and a polarizing filter 36-2D that transmits red EMR 16 having a linear polarization orientation along 90 degrees (and also transmits the blue EMR 16 with the linear polarization orientation along 0 degrees). The sensor 24-2B generates three channels of sensor data, a red channel, a blue channel, and a green channel. Thus, by reading the blue channel of an image frame, the processor device 28 can obtain information about the EMR 16 that has a polarization orientation along 0 degrees, and by reading the red channel of the same image frame, the processor device 28 can obtain information about the EMR 16 that has a polarization orientation along 90 degrees.

Similarly, the polarizing filter assembly 22-2A has a polarizing filter 36-2A that transmits blue EMR 16 having a linear polarization orientation along 45 degrees, and a polarizing filter 36-2B that transmits red EMR 16 having a linear polarization orientation along 135 degrees (and also transmits the blue EMR 16 with the polarization orientation along 45 degrees). The sensor 24-2A generates three channels of sensor data, a red channel, a blue channel, and a green channel. Thus, by reading the blue channel of an image frame, the processor device 28 can obtain information about the EMR 16 that has a polarization orientation along 45 degrees, and by reading the red channel of the same image frame, the processor device 28 can obtain information about the EMR 16 that has a polarization orientation along 135 degrees. Thus, with one image frame from the sensor 24-2A and one image frame from the sensor 24-2B, the processor device 28 obtains information about the EMR 16 along the four different polarization orientations.

In one embodiment, the following computations are performed for each detector element. These calculations result in five images, or image arrays, that correspond to S0, S1, S2, degree of polarization, and polarization angle values. The red and blue channels may be designated as: Red1 (90 degrees), Blue1 (0 degrees), Red2 (135 degrees), and Blue2 (45 degrees). The Stokes parameters using these designations may be computed as: S0=(Red1+Blue1+Red2+Blue2)/

2, S1=Red1−Blue1, and S2=Red2−Blue2. In one embodiment, the noise in the three Stokes images (S0, S1, S2) may be reduced by convolving these images with a 9×9 array of (1/81)'s.

Once the Stokes parameter images are established, the two metrics may be computed by the following formulas to form a DOP image and a Polarization Angle image:

Degree of Polarization=(sqrt((S1)²+(S2)²))/S0

Polarization Angle=0.5*a tan 2(S2,S1)

The DOP image comprises pixels that correspond to the detector elements, and have an associated value of the degree of polarization associated with that corresponding detector element. The polarization angle image comprises pixels that correspond to the detector elements, and have an associated value of the polarization angle associated with that corresponding detector element.

In estimating the elevation angle of the sun, the Rayleigh scattering model may be used. In one embodiment, the optical assembly 20 is positioned pointing upward. A subset of pixels near the center of the DOP image is selected, about 5 degrees, for example, in each direction may be chosen. These center pixels are selected since they most closely approximate an upward looking sky position correlation. The minimum degree of polarization value in this set is selected and normalized by dividing by the maximum of the degree of polarization in the full DOP image. This forces the normalized selected DOP value to be no greater than one and makes the Rayleigh scattering model equation consistent. In order to visualize the sun's elevation angle, one may consider the sun 14 above the earth 18 and visualize those locations on the earth 18 where the elevation angle to the sun 14 is given. The locus of points on the earth 18 that have this particular elevation angle to the sun 14 is easily seen as an ellipse where the center of the ellipse is the point on the earth 18 that is directly below the sun 14. With this information, it is clear that the observation point is located somewhere on this ellipse.

Figure 7:
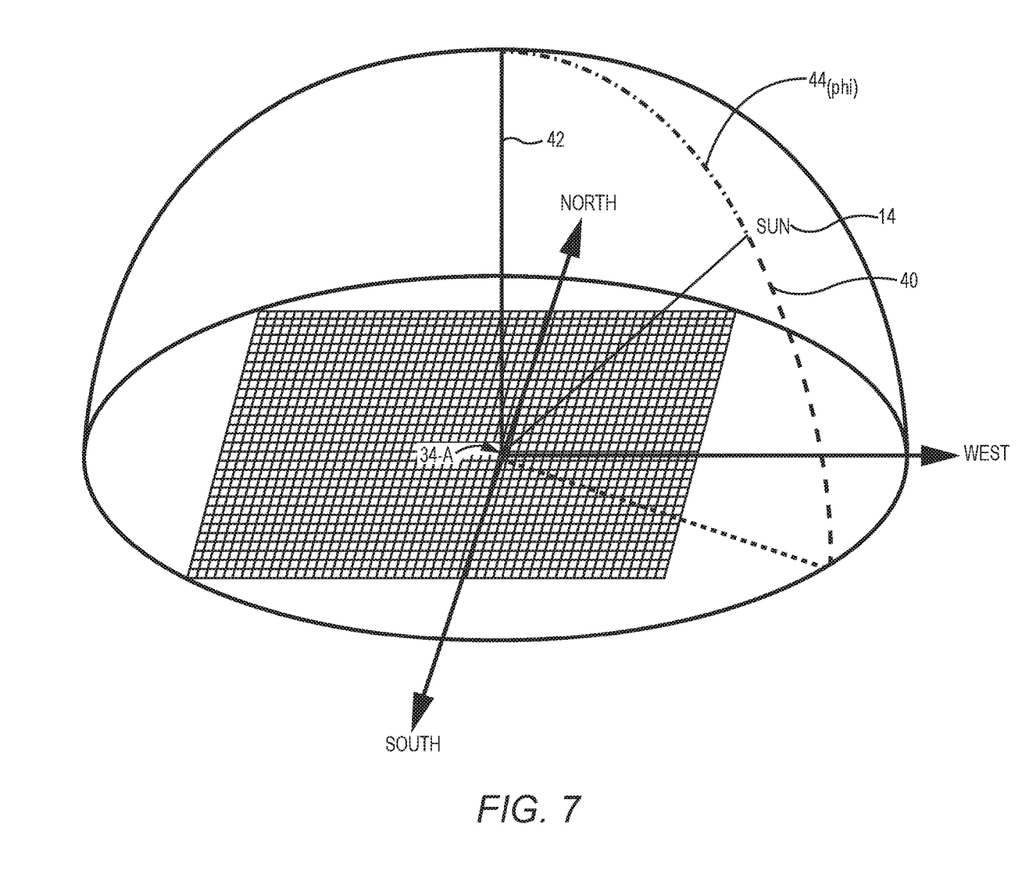
FIG. 7 is a diagram that illustrates the determination of an elevation angle according to one embodiment.

FIG. 7 is a diagram that illustrates the determination of an elevation angle 40 according to one embodiment. In this example, a detector element 34-A is identified as having the minimum DOP, and thus looking in a directly upward direction 42. An angle 44 (phi) can be determined in accordance with the following Rayleigh scattering model equation:

Degree of Polarization=(sin(phi)*sin(phi))/(1+cos(phi)*cos(phi)), wherein Degree of Polarization is the degree of polarization of the detector element 34-A.

The angle 44 (phi) is an estimate of the angle between the upward direction 42 and the angle to the sun 14. The elevation angle 40 can be determined by subtracting the angle phi from 90 degrees.

An estimate of the azimuth angle (or bearing angle) to the sun 14 may also be determined. Both the DOP image and the polarization angle image contain information that may be used to make this determination. Theory predicts that the location of the maximum DOP value will be 90 degrees away from the bearing angle location of the sun 14. By locating the maximum value in the image of DOP values, an angle to the location of a pixel containing the maximum value from the image center is estimated. A line from this maximal DOP pixel position to the center of the image should be perpendicular to a line from the center of the image to the bearing direction of the sun and thus provides information to be used in estimating the sun's bearing angle (or azimuth).

Additional Mathematical Discussion

The polarization pattern of the EMR 16 can be reduced to the three parameters (I, d, φ) intensity (I), degree of polarization (d) and angle of polarization (φ).

For a particular geometry of a sensor 24 and the sky radiance, the response of a pixel (x,y) can be described in the measurement, f, as:

$$f_j(\varphi) = KI[1 + d\cos(2\varphi - \varphi_j)] = KId \cos 2\varphi \cos 2\varphi_j + KId \sin 2\varphi \sin 2\varphi_j,$$

wherein K is the gain of a CCD sensor 24, I is the intensity of the EMR 16, d is the degree of polarization, φ is the angle between the polarization direction of incident light and the reference coordinate axis, and $\varphi_j$ is the orientation of the transmission axis of a polarizing filter 36 at jth exposure.

For every detector element 34 in the CCD sensor 24, assuming the recorded data contains a number of samples $f_1$, $f_2$, ... $f_M$ taken with the orientation of the polarizer at $\varphi_1$, $\varphi_2$, ... $\varphi_M$. If we define $A_0 = KId \cos 2\varphi$, $B_0 = KId \sin 2\varphi$ and $C_0 = KI$, then:

$$f_j(\varphi) = A_0 \cos 2\varphi_j + B_0 \sin 2\varphi_j + C_0,$$

wherein $A_0$, $B_0$, $C_0$ correspond to the elements of the linear Stokes vectors S1, S2, S0 respectively. With M polarizer filter orientation measurements, matrix math may be used to solve for the Stokes parameters using any combination of measurements of the polarizer angle.

For example, with 3 measurements, such as illustrated in FIG. 5, where $\varphi_1 = -60°$, $\varphi_2 = 0°$, and $\varphi_3 = 60°$, then with the three measurements ($f_1$, $f_2$, $f_3$), the Stokes parameters for each pixel in the collected imagery become:

$$S0 = \frac{2(f_1 + f_2 + f_3)}{3}$$

$$S1 = \frac{2f_2 - f_1 - f_3}{3}$$

$$S2 = \frac{f_3 - f_1}{\sqrt{3}}$$

The sky angle of polarization and the degree of polarization (DOP) can be found from:

$$\Phi = \frac{1}{2}\text{atan2}(S2, S1)$$

$$d = \frac{\sqrt{S1^2 + S2^2}}{S0}$$

The DOP can be used with the Rayleigh criteria to compute a depression angle of the sun in the sky. The Rayleigh scattering model presents an alternative form for the DOP:

$$DOP = \frac{\sin^2(\varphi)}{1 + \cos^2(\varphi)}$$

In this form, the angle phi (φ) represents the angle between the observed point and the sun 14. If we allow the upward direction 42 to be the observed point, then we can estimate the angle between that point and the sun 14. In this case, this angle 44 (phi) would be the complementary angle to the elevation angle 40 of the sun 14. We follow this path to make an estimate of the sun's elevation angle from the observer's position.

As an example using a red and blue camera polarizing system, we start by making the proper adjustments to the system to ensure the images are calibrated across channels and cameras. With simultaneous collections using two cameras, polarization information is recorded with each camera, one with the red peaked transmission and one with the blue peaked transmission, but with different polarization states. These are referred to herein as red1, red2, blue1 and blue2. The Stokes parameters are computed by combining the channels as:

$S0=(red1+blue1+red2+blue2)/2;$ $S1=red1-blue1;$ $S2=red2-blue2.$

In order to normalize the angle measurements, pixel coordinates are transformed into angle coordinates using the camera FOVs in both horizontal and vertical directions. The DOP values are computed for each of the pixels. A small subset is extracted, about 5 degrees in each direction, about the image center. These pixels are nearest to the center of the image and hence closest to pointing up in our collection configuration. A normalized DOP value is created representing the central value by choosing the minimum DOP value in the small window and dividing the minimum DOP value by a value close to the maximum DOP value over the entire image. Next, a table of DOP values created by varying the angle value phi from 0 to 90 degrees is used to find the best match between this normalized DOP value and the table of DOP values computed in this table. This is an estimate of the angle between the up direction and the location of the sun 14. By subtracting this angle from 90 degrees, an estimate of the elevation of the sun 14 from the observation point is calculated. One additional benefit of this approach is that it does not require a very large camera FOV to execute this process.

Again, considering the Rayleigh scattering model for the DOP formula, we see that the DOP will be large when the angle between the observation point and the sun 14 is near 90 degrees. Also, in the direction of the sun 14 itself, the DOP is small. Regarding the Stokes parameters and how they relate to the location of the sun 14, as either S1 or S2 decrease, or as both S1 and S2 decrease, the DOP value decreases as well, and hence points in a direction towards the sun 14. In addition, the polarization angle is impacted by the magnitude of the S1 and S2 values. For small magnitude S1 values, the polarization angle is close to 90 or −90 degrees. For small magnitude S2 values, the polarization angle is close to 0. Each of these factors provides clues as to the bearing of the sun 14 from the observation position.

The polarization angle defined earlier has an alternate formula based on the Rayleigh scattering model and the various angles between the observation point in the sky, the position of the sun 14 and the zenith point directly over the observation position. It is given by the following formula:

$$\tan(\varphi) = \frac{\sin(\gamma_s)\cos(\gamma)\cos(\alpha - \alpha_s) - \cos(\gamma_s)\sin(\gamma)}{\sin(\gamma_s)\sin(\alpha - \alpha_s)}$$

wherein:
$\varphi$=Polarization Angle,
$\gamma$=off-axis angle for the observed point on the celestial sphere, $\gamma_s$=off-axis angle for the sun 14 on the celestial sphere,
$\alpha$=azimuth angle for the observation point, and
$\alpha_s$=azimuth angle for the sun 14.

As an application with this system, the difference of azimuth angles between the sun 14 and the observation point may be estimated using this equation. From the calculation of the polarization angle using the Stokes parameters presented above, we have an estimate of the polarization angle for each point in the image. We transform the locations in the image from pixel coordinates to angle coordinates using the horizontal and vertical fields of view. We make a correspondence between pixel coordinates to off-axis angles covering the set of sky points observed. Earlier, we presented a method to estimate the elevation of the sun 14 based on the DOP values. At this point, we have estimates for each of the arguments in the polarization angle formula presented except for the difference of azimuth angles. We solve this equation across the image to estimate this difference in azimuth angles. This provides an estimate of the bearing to the sun 14. We now have estimates of the elevation angle and bearing of the sun 14. By combining the elevation and bearing of the sun 14 with the catalogue values for the true location of the sun 14, an estimate of the observation position is produced.

Those skilled in the art will recognize improvements and modifications to the preferred embodiments of the disclosure. All such improvements and modifications are considered within the scope of the concepts disclosed herein and the claims that follow.

What is claimed is:
1. An optical assembly comprising:
at least one polarizing filter assembly;
at least one sensor comprising a grid of a plurality of detector elements; and
a processor device coupled to the at least one sensor;
wherein the at least one polarizing filter assembly is configured to:
  receive electromagnetic radiation (EMR) emitted by a sun;
  transmit, by the at least one polarizing filter assembly, at least three different portions of EMR towards the at least one sensor, each portion filtered based on a different polarization orientation, and at least two portions of the at least three different portions of EMR comprising different wavebands of EMR; and
wherein the processor device is configured to:
  receive sensor data generated by the at least one sensor in response to receipt of the at least three different portions of EMR; and
  based on the sensor data, determine an elevation angle of the sun with respect to a horizon from a geographic location of the optical assembly.

2. The optical assembly of claim 1 wherein to determine the elevation angle of the sun with respect to the horizon from the geographic location of the optical assembly, the processor device is further configured to generate a degree of polarization image based on the sensor data, the degree of polarization image comprising a plurality of pixels, each pixel containing a degree of polarization value corresponding to one of the detector elements.

3. The optical assembly of claim 1 wherein to determine the elevation angle of the sun, the processor device is further configured to:
  generate a degree of polarization image based on the sensor data, the degree of polarization image comprising a plurality of pixels, each pixel containing a degree of polarization value corresponding to one of the detector elements;

identify a group of pixels about a center of the degree of polarization image;

determine a smallest degree of polarization value associated with any pixel in the group of pixels; and based on the smallest degree of polarization value, determine the elevation angle of the sun with respect to the horizon from the geographic location of the optical assembly.

4. The optical assembly of claim 1 wherein the processor device is further configured to, based on the sensor data, determine an azimuth of the sun with respect to a reference meridian.

5. The optical assembly of claim 4 wherein to determine the azimuth of the sun, the processor device is further configured to:

generate a degree of polarization image based on the sensor data, the degree of polarization image comprising a plurality of pixels, each pixel containing a degree of polarization value corresponding to one of the detector elements;

determine at least one pixel based on a largest degree of polarization value associated with any pixel in the degree of polarization image; and based at least in part on a location of the at least one pixel in the degree of polarization image, determine the azimuth of the sun with respect to the reference meridian.

6. The optical assembly of claim 1 wherein the at least one polarizing filter assembly comprises a single polarizing filter assembly, and the at least one sensor comprises a single sensor, the single polarizing filter assembly comprising:

a first polarizing filter configured to receive the EMR emitted by the sun and to transmit a first subset of EMR comprising:
  a first portion of EMR in a first waveband that has a first polarization orientation;
  EMR in a second waveband irrespective of polarization orientation; and
  EMR in a third waveband irrespective of polarization orientation;

a second polarizing filter downstream of the first polarizing filter configured to receive the first subset of EMR and to transmit a second subset of EMR comprising:
  a second portion of EMR in the second waveband that has a second polarization orientation;
  the EMR in the third waveband irrespective of polarization orientation; and
  the first portion of EMR in the first waveband; and a third polarizing filter downstream of the second polarizing filter configured to receive the second subset of EMR and to transmit a third subset of EMR towards the single sensor comprising:
  a third portion of EMR in the third waveband that has a third polarization orientation;
  the second portion of EMR in the second waveband; and
  the first portion of EMR in the first waveband.

7. The optical assembly of claim 6 wherein the first polarization orientation, second polarization orientation, and third polarization orientation are each linear polarization orientations that are each about 60 degrees from one another.

8. The optical assembly of claim 1 wherein the at least one polarizing filter assembly comprises a first polarizing filter assembly and a second polarizing filter assembly, and wherein the at least one sensor further comprises a first sensor that receives EMR from the first polarizing filter assembly and a second sensor that receives EMR from the second polarizing filter assembly, the first polarizing filter assembly comprising:

a first polarizing filter configured to receive the EMR emitted by the sun and to transmit a first subset of EMR comprising:
  a first portion of EMR in a first waveband that has a first polarization orientation; and
  EMR in a second waveband that is different from the first waveband irrespective of polarization orientation;

a second polarizing filter downstream of the first polarizing filter configured to receive the first subset of EMR and to transmit a second subset of EMR towards the first sensor comprising:
  a second portion of EMR in the second waveband that has a second polarization orientation; and
  the first portion of EMR in the first waveband; and the second polarizing filter assembly comprising:
a third polarizing filter configured to receive the EMR emitted by the sun and to transmit a third subset of EMR comprising:
  a third portion of EMR in a third waveband that is different from the first waveband and that has a third polarization orientation; and
  EMR in a fourth waveband that is different from the third waveband irrespective of polarization orientation; and a fourth polarizing filter downstream of the third polarizing filter configured to receive the third subset of EMR and to transmit a fourth subset of EMR towards the second sensor comprising:
  a fourth portion of EMR in the fourth waveband that has a fourth polarization orientation; and
  the third portion of EMR in the third waveband.

9. The optical assembly of claim 8 wherein the first polarization orientation, the second polarization orientation, the third polarization orientation, and the fourth polarization orientation are all linear polarization orientations, and wherein the first polarization orientation is 90 degrees from the second polarization orientation and the third polarization orientation is 90 degrees from the fourth polarization orientation.

10. The optical assembly of claim 8 wherein the first waveband and the third waveband are a same waveband, and the second waveband and the fourth waveband are the same waveband.

11. The optical assembly of claim 1 wherein the at least one polarizing filter assembly comprises a first polarizing filter assembly, a second polarizing filter assembly, and a third polarizing filter assembly, and wherein the at least one sensor further comprises a first sensor that receives EMR from the first polarizing filter assembly, a second sensor that receives EMR from the second polarizing filter assembly, and a third sensor that receives EMR from the third polarizing filter assembly, the first polarizing filter assembly comprising:

a first polarizing filter configured to receive the EMR emitted by the sun and to transmit a first portion of EMR in a first waveband that has a first polarization orientation towards the first sensor;

the second polarizing filter assembly comprising:
a second polarizing filter configured to receive the EMR emitted by the sun and to transmit a second portion of EMR in a second waveband that has a second polarization orientation towards the second sensor; and
the third polarizing filter assembly comprising:
a third polarizing filter configured to receive the EMR emitted by the sun and to transmit a third portion of EMR in a third waveband that has a third polarization orientation towards the third sensor.

12. The optical assembly of claim 11 wherein the optical assembly further comprises a fourth polarizing filter assembly associated with a fourth sensor, the fourth polarizing filter configured to receive the EMR emitted by the sun and to transmit a fourth portion of EMR in a fourth waveband that has a fourth polarization orientation towards the fourth sensor.

13. A method comprising:
receiving, by at least one polarizing filter assembly, electromagnetic radiation (EMR) emitted by a sun;
passing, by the at least one polarizing filter assembly, at least three different portions of EMR towards at least one sensor, each portion filtered based on a different polarization orientation and at least two portions of the at least three different portions of EMR comprising different wavebands of EMR, the at least one sensor comprising a grid of a plurality of detector elements;
generating, by the at least one sensor, sensor data in response to receipt of the at least three different portions of EMR; and
based on the sensor data, determining an elevation angle of the sun with respect to a horizon from a geographic location.

14. The method of claim 13 wherein determining the elevation angle of the sun with respect to the horizon from the geographic location comprises generating a degree of polarization image based on the sensor data, the degree of polarization image comprising a plurality of pixels, each pixel containing a degree of polarization value corresponding to one of the detector elements.

15. The method of claim 13 wherein determining the elevation angle of the sun further comprises:
generating a degree of polarization image based on the sensor data, the degree of polarization image comprising a plurality of pixels, each pixel containing a degree of polarization value corresponding to one of the detector elements;
identifying a group of pixels about a center of the degree of polarization image;
determining a smallest degree of polarization value associated with any pixel in the group of pixels; and
based on the smallest degree of polarization value, determining the elevation angle of the sun with respect to the horizon from the geographic location.

16. The method of claim 13 further comprising based on the sensor data, determining an azimuth of the sun with respect to a reference meridian.

17. The method of claim 16 wherein determining the azimuth of the sun further comprises:
generating a degree of polarization image based on the sensor data, the degree of polarization image comprising a plurality of pixels, each pixel containing a degree of polarization value corresponding to one of the detector elements;
determining at least one pixel based on a largest degree of polarization value associated with any pixel in the degree of polarization image; and based at least in part on the location of the at least one pixel in the degree of polarization image, determining the azimuth of the sun with respect to the reference meridian.

18. The method of claim 13 wherein passing, by the at least one polarizing filter assembly, the at least three different portions of EMR towards the at least one sensor, further comprises:
transmitting, by a first polarizing filter, a first subset of EMR comprising:
a first portion of EMR in a first waveband that has a first polarization orientation;
EMR in a second waveband irrespective of polarization orientation; and
EMR in a third waveband irrespective of polarization orientation;
receiving by a second polarizing filter downstream of the first polarizing filter the first subset of EMR;
transmitting, by the second polarizing filter, a second subset of EMR comprising:
a second portion of EMR in the second waveband that has a second polarization orientation;
the EMR in the third waveband irrespective of polarization orientation; and
the first portion of EMR in the first waveband; and
receiving, by a third polarizing filter downstream of the second polarizing filter, the second subset of EMR; and
transmitting, by the third polarizing filter, a third subset of EMR towards the at least one sensor comprising:
a third portion of EMR in the third waveband that has a third polarization orientation;
the second portion of EMR in the second waveband; and
the first portion of EMR in the first waveband.

19. The method of claim 18 wherein the first polarization orientation, the second polarization orientation, and the third polarization orientation are each linear polarization orientations that are each about 60 degrees from one another.

20. The method of claim 13 wherein:
receiving, by the at least one polarizing filter assembly, EMR emitted by the sun comprises:
receiving by a first polarizing filter assembly comprising a first polarizing filter and a second polarizing filter, and a second polarizing filter assembly comprising a third polarizing filter and a fourth polarizing filter, the EMR from the sun; and
passing, by the at least one polarizing filter assembly, the at least three portions of EMR towards the at least one sensor, each portion filtered based on the different polarization orientation comprises:
transmitting, by the first polarizing filter, a first subset of EMR comprising:
a first portion of EMR in a first waveband that has a first polarization orientation; and
EMR in a second waveband that is different from the first waveband irrespective of polarization orientation;
receiving, by the second polarizing filter downstream of the first polarizing filter, the first subset of EMR;
transmitting, by the second polarizing filter, a second subset of EMR towards a first sensor comprising:
a second portion of EMR in the second waveband that has a second polarization orientation; and
the first portion of EMR in the first waveband; and
transmitting, by the third polarizing filter, a third subset of EMR comprising:

a third portion of EMR in a third waveband that is different from the first waveband and that has a third polarization orientation; and EMR in a fourth waveband that is different from the third waveband irrespective of polarization orientation;

receiving, by a fourth polarizing filter downstream of the third polarizing filter, the third subset of EMR; and transmitting, by the fourth polarizing filter, a fourth subset of EMR towards a second sensor comprising:
a fourth portion of EMR in the fourth waveband that has a fourth polarization orientation; and
the third portion of EMR in the third waveband.

21. The method of claim 20 wherein the first waveband and the third waveband are a same waveband, and the second waveband and the fourth waveband are the same waveband.

22. The method of claim 20 wherein the first polarization orientation, the second polarization orientation, the third polarization orientation, and the fourth polarization orientation are all linear polarization orientations, and wherein the first polarization orientation is 90 degrees from the second polarization orientation and the third polarization orientation is 90 degrees from the fourth polarization orientation.

* * * * *